United States Patent Office 3,352,816
Patented Nov. 14, 1967

3,352,816
STABILITY OF POLYOLEFINES
Gerhard Meyer, Obernburg, Erhard Siggel, Seckmauern uber Hochst, Odenwald, Albert Schopf, Hering uber Hochst, Odenwald, and Helmut Magerlein, Erlenbach, Germany, assignors to Vereinigte Glanzstoff-Fabriken AG., Wuppertal-Elberfeld, Germany
No Drawing. Filed Jan. 26, 1965, Ser. No. 428,199
Claims priority, application Germany Jan. 31, 1964, V 25,288
15 Claims. (Cl. 260—45.7)

ABSTRACT OF THE DISCLOSURE

Stabilizing a high molecular weight poly-α-monoolefine such as polypropylene against oxidation by treating it in finely divided form dispersed in water or a lower alkanol containing a small amount, e.g. 0.1 to 1% by weight with reference to the poly-α-monoolefine, of an alkali metal, alkaline earth metal or ammonium bisulfite at temperatures of 20–140° C. for a period of one to five hours, and then separating the poly-α-monoolefine from the liquid medium. Examples of the bisulfites include sodium bisulfite, calcium bisulfite and ammonium bisulfite. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine in a mixture of water and a water-soluble lower alkanol as a dispersing agent containing a small amount of a bisulfite selected from the group consisting of alkali metal-, alkaline earth metal- and ammonium-bisulfites, and heating this dispersion with mixing or agitation at a temperature of about room temperature or 20° C. up to the boiling point of the dispersing agent, e.g. from about 20° C. to 140° C. and preferably about 50°–100° C., for a period of time sufficient to enhance the oxidation-resistance of the polyolefine. The polyolefine is then separated from the dispersion for example, by filtration, and is then preferably washed two or more times with the water and/or alcohol used in the dispersing liquid and finally dried by evaporation or distilling off any adherent liquid.

The process of the present invention is particularly advantageous for the treatment of poly-alpha-monoolefines of from 2 up to about 8 carbon atoms in the monomeric alphamonoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product. The preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified be removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen, and the purified polyolefine can then be treated in the same apparatus under the same oxygen-free environment, thereby avoiding any procedural complications. It is desirable to remove the polymerization catalyst as completely as possible before treating the polymer powder with the aqueous solution of alcohol and bisulfite.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 m$\mu$ to 500 m$\mu$.

The bisulfite additive employed as the treating agent can be added to the water-alcohol mixtuer in quite small amounts of at least 0.01% and preferably about 0.1 to 1% by weight, with reference to the total amount of the polyolefine. Somewhat higher amounts of the bisulfite, e.g. up to 2% or even 5% by weight (with reference to the polyolefine), can also be employed but without any special advantage. The preferred additives are the sodium, potassium, ammonium and calcium bisulfites. The term "bisulfite" is intended to include a metabisulfite, such as sodium metabisulfite. Likewise it is possible to use other bisulfites, e.g. $Be(HSO_3)_2$, $Mg(HSO_3)_2$, $Ba(HSO_3)_2$, $Sr(HSO_3)_2$, $LiHSO_3$, $RbHSO_3$, $CsHSO_3$ working in the same way but most of them will not used because they have no technical importance.

The process of the invention is preferably carried out in such a manner that an approximately 0.05–5% solution of the bisulfite in the water-alcohol mixture is produced and this solution is then used for dispersing the polyolefine, the amount of the solution being adjusted so as to provide the desired parts by weight of bisulfite for each part by weight of polyolefine. Since the bisulfites are soluble in water but not in alcohol, the water merely serves as a solvent for the bisulfite while the alcohol serves as an inert dispersing liquid. In general, the proportion of water required in the alcohol-water mixture can be readily determined by making preliminary solubility tests of the particular bisulfite in various water-alcohol mixtures. For example, the following tabulation sets forth the solubility values for particular bisulfites in various ethanol-water mixtures:

| Bisulfite | Maximum amount soluble in percent by weight | Ethanol:water parts by weight |
|---|---|---|
| Na-bisulfite | 22.5 | 1:3 |
| Do | 7.9 | 1:1 |
| K-bisulfite | 12.1 | 1:3 |
| Do | 3.9 | 1:1 |

The ratio in parts by weight of alcohol to water can fall within a relatively broad range of 4:1 to 1:4, preferably about 1:1 to 1:3. Also, it is preferable to employ water-soluble or water-miscible lower alkanols such as methanol or ethanol which provide alcoholic-aqueous solutions boiling at temperatures below about 100° C.

The temperatures and periods of time for any specific treatment obviously depend on a number of different factors. At higher temperatures, the treatment can be completed more quickly. In order to shorten the treatment period, it is also possible to work under elevated pressure in a closed vessel at temperatures which extend up to the boiling point of the alcohol-water mixture at the pressure being considered. In general, however, the process of the invention is best carried out with treatment periods of about 1 to 5 hours at temperatures of about 100° C. or less, e.g. 80°–100° C.

By comparison with known stabilizing methods, the process of the present invention offers the advantage that it can be carried out directly after the purification of the polymer without interfering with the nomal polymerization or the separation and recovery of the polymerization catalyst and purified polymer. The dispering agent employed in the stabilizing process of the invention is also a solvent which has been found to be useful in the preceding purification process. The excess dispersing agent can be separated by filtration or centrifuging, and the polymer is then easily purified by a simple washing with the dispersing agent. Thus, it is possible to avoid a special purification as is required in known methods which use a heterogeneous catalyst for the stabilizing treatment. A much more uniform and extensive stabilization is obtained by contacting the polyolefine powder with the bisulfite contained in the dispersing agent according to the invention than is possible by incorporating or engraining a stablilizing agent into the polymer.

The process of the invention is further illustrated but not limited by the following examples.

*Examples 1–6*

Into a 1-liter two-necked flask equipped with an agitator and reflux condenser, there were introduced 600 ml. of a bisulfite solution in a water-methanol mixture (1 part by weight of methanol to 3 parts by weight of water). While maintaining this solution under a nitrogen atmosphere, 100 grams of polypropylene or poly-4-methylpentene-1 were dispersed in the solution, and the resulting dispersion was heated with mixing as described in the table below. The polymers being treated were produced by polymerization of propylene or 4-methylpentene-1 in the presence of aluminum triethyl and $TiCl_3$ as stereospecific catalyst. After completion of this polymerization, the resulting polymer powder was purified with hexane and with methanol in admixture with hydrochloric acid, washed neutral and then dried. After completing the treatment with the bisulfite, the alcohol-water solution was filtered off, the polymer powder washed neutral with a water-alcohol mixture and thereafter dried in a vacuum chamber under a nitrogen atmosphere. Finally, the stability of the treated polymer was measured as described below.

TABLE

| Ex. No. | Bisulfite | Percent by weight* | Treatment time-hours | Temp., °C. | Stability, minutes |
|---|---|---|---|---|---|
| 1 | Ca-bisulfite | 1 | 3 | 100 | 103 |
| 2 | K-bisulfite | 0.5 | 2 | 100 | 120 |
| 3 | Na-metabisulfite | 0.4 | 3.5 | 100 | 109 |
| 4 | | | 3 | 100 | 45 |
| 5 | Ca-bisulfite | 1 | 4 | 100 | 13 |
| 6 | | | 4 | 100 | 5 |

*Percent by weight with reference to the polyolefine.

In the above table, Example 1—4 relate to the treatment of polypropylene whereas Examples 5 and 6 are concerned with the treatment of poly-4-methylpentene-1. Examples 4 and 6 were carried out as control experiments by omitting the bisulfite additive.

For determination of the stability of the treated polyolefine in the foregoing examples, 30 grams of the polymer powder were ground in a ball mill for a period of 30 minutes with a stabilizing mixture of 0.03 gram dilaurylthiodipropionate and 0.3 gram of 4,4'-thio-bis-(3-methyl-6-t-butyl-phenol), i.e. 0.1% by weight in each case. 12 grams of this mixture were pressed in a plate press at 170° C. and under a pressure of 350 atm. into a 1 mm. thick plate. The plate was cut into strips 3–4 mm. wide and 30–40 mm. long from which 3 grams were introduced into a test tube standing in an aluminum block maintained at 200±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentene-(1), the measurement was carried out at 230° C. and the oxygen was introduced into the stabilized, unpressed powder contained in the test tube.

Similar results were achieved when using ethanol in place of methanol or when using ammonium bisulfite in place of the additives shown in the table. Likewise it is possible to use other bisulfites, e.g. $Be(HSO_3)_2$, $Mg(HSO_3)_2$, $Ba(HSO_3)_2$, $Sr(HSO_3)_2$, $LiHSO_3$, $RbHSO_3$, $CsHSO_3$, which work in the same way.

The invention is hereby claimed as follows:

1. A process for improving the stability of a high molecular weight poly-α-monoolefine which comprises: dispersing said poly-α-monoolefine as a finely divided powder in a mixture of water and a water-soluble lower alkanol as a dispersing agent containing a small amount of a bisulfite selected from the group consisting of alkali metal-, alkaline earth metal- and ammonium-bisulfites; heating said dispersion with agitation at a temperature of about 20° C. up to the boiling point of the dispersing agent for a period of time sufficient to enhance the oxidation-resistance of the poly-α-monoolefine; and separating the poly-α-monoolefine from the dispersion.

2. A process as claimed in claim 1 wherein said bisulfite is present in an amount of at least about 0.01% by weight, with reference to the poly-α-monoolefine.

3. A process as claimed in claim 1 wherein said bisulfite is present in an amount of about 0.1 to 1% by weight, with reference to the poly-α-monoolefine.

4. A process as claimed in claim 1 wherein said dispersion is heated at a temperature of about room temperature up to about 140° C.

5. A process as claimed in claim 1 wherein said dispersion is heated at a temperature of about 50° C. to 100° C.

6. A process as claimed in claim 1 wherein said dispersion is heated for a period of about 1 to 5 hours.

7. A process as claimed in claim 1 wherein said bisulfite is sodium bisulfite.

8. A process as claimed in claim 1 wherein said bisulfite is potassium bisulfite.

9. A process as claimed in claim 1 wherein said bisulfite is calcium bisulfite.

10. A process as claimed in claim 1 wherein said bisulfite is sodium metabisulfite.

11. A process as claimed in claim 1 wherein said dispersion is heated at a temperature of about 20° C. to 100° C. for a period of about 1 to 5 hours in the presence of about 0.1 to 1% by weight of said bisulfite, with reference to said poly-α-monoolefine, and the poly-α-monoolefine is separated and washed with the dispersing agent.

12. A process as claimed in claim 11 wherein said poly-α-monoolefine is polypropylene.

13. A process as claimed in claim 11 wherein said poly-α-monoolefine is poly-4-methylpentene-1.

14. The stabilized poly-α-monoolefine product obtained by the process of claim 1.

15. The stabilized poly-α-monoolefine product obtained by the process of claim 11.

References Cited
UNITED STATES PATENTS 2,960,486 11/1960 Pye _____ 260—45.7
3,247,150 4/1967 Hahn et al. _____ 260—29.6

DONALD E. CZAJA, *Primary Examiner.*

M. J. WELSH, *Assistant Examiner.*

UNITED STATES PATENT OFFICE
CERTIFICATE OF CORRECTION

Patent No. 3,352,816                November 14, 1967

Gerhard Meyer et al.

It is certified that error appears in the above identified patent and that said Letters Patent are hereby corrected as shown below:

Column 3, line 24, "be" should read -- by --; line 49, "ixtuer" should read -- mixture --. Column 4, line 35, "nomal" should read -- normal --; line 60, "atmophere" should read -- atmosphere --. Column 5, line 14, "Example 1-4" should read -- Examples 1-4 --; line 23, "0.3 gram" should read -- 0.03 gram --.

Signed and sealed this 23rd day of September 1969.

(SEAL)
Attest:

Edward M. Fletcher, Jr.          WILLIAM E. SCHUYLER, JR.
Attesting Officer                 Commissioner of Patents